United States Patent
Clifford et al.

(10) Patent No.: US 10,210,387 B2
(45) Date of Patent: Feb. 19, 2019

(54) METHOD AND APPARATUS FOR DETECTING AND CLASSIFYING OBJECTS ASSOCIATED WITH VEHICLE

(71) Applicant: GM GLOBAL TECHNOLOGY OPERATIONS LLC, Detroit, MI (US)

(72) Inventors: David Clifford, Royal Oak, MI (US); Orhan Demirovic, Sterling Heights, MI (US); Orhan Bulan, Troy, MI (US); Eric Hatfield, Clinton Township, MI (US); David Hiemenga, Grand Rapids, MI (US); Mohannad Murad, Troy, MI (US)

(*) Notice: Subject to any disclaimer, the term of this patent is extended or adjusted under 35 U.S.C. 154(b) by 133 days.

(21) Appl. No.: 15/585,764

(22) Filed: May 3, 2017

(65) Prior Publication Data
US 2018/0322342 A1    Nov. 8, 2018

(51) Int. Cl.
| | |
|---|---|
| *G06K 9/00* | (2006.01) |
| *G06T 7/11* | (2017.01) |
| *G06T 7/70* | (2017.01) |
| *B60R 1/00* | (2006.01) |
| *G06K 9/62* | (2006.01) |
| *H04N 7/18* | (2006.01) |

(52) U.S. Cl.
CPC .......... *G06K 9/00536* (2013.01); *B60R 1/00* (2013.01); *G06K 9/6202* (2013.01); *G06K 9/6215* (2013.01); *G06T 7/11* (2017.01); *G06T 7/70* (2017.01); *H04N 7/183* (2013.01); *B60R 2300/30* (2013.01); *B60R 2300/8006* (2013.01); *G06T 2207/10016* (2013.01); *G06T 2207/30268* (2013.01)

(58) Field of Classification Search
USPC .......................................... 382/103, 107, 224
See application file for complete search history.

(56) References Cited

U.S. PATENT DOCUMENTS

| | | | |
|---|---|---|---|
| 6,856,694 B2* | 2/2005 | Farmer | G06K 9/00362 382/107 |
| 10,052,972 B2* | 8/2018 | Raffa | B60N 2/002 |
| 2007/0055428 A1* | 3/2007 | Kong | G06K 9/00369 701/45 |
| 2017/0013188 A1* | 1/2017 | Kothari | B60R 11/0235 |
| 2017/0313248 A1* | 11/2017 | Kothari | B60K 35/00 |
| 2018/0074494 A1* | 3/2018 | Myers | G06Q 10/025 |

* cited by examiner

*Primary Examiner* — Ishrat I Sherali

(57) ABSTRACT

A method and apparatus for detecting and classifying objects associated with a vehicle are provided. The method includes capturing a first image and a second image of a cabin of a vehicle, dividing the first image and the second image into a plurality of regions, comparing a first region of the first image to a second region of the second image, in response to detecting a difference between the second region and the first region, classifying an object present in the difference between the second region and the first region and labeling the classified object, and providing a notification of the classified object to at least one from among an occupant of the vehicle and an operator of the vehicle.

18 Claims, 3 Drawing Sheets

METHOD AND APPARATUS FOR DETECTING AND CLASSIFYING OBJECTS ASSOCIATED WITH VEHICLE

INTRODUCTION

Apparatuses and methods consistent with exemplary embodiments relate to image based object recognition. More particularly, apparatuses and methods consistent with exemplary embodiments relate detecting objects in images of a vehicle cabin.

SUMMARY

One or more exemplary embodiments provide a method and an apparatus that compare images of an interior of a vehicle to determine whether changes have occurred. More particularly, one or more exemplary embodiments provide a method and an apparatus that divide up images of areas of a vehicle, compare the regions of the divided images to determine whether a change has occurred, and notify an operator of a vehicle or a fleet of the change in the images. The method and apparatus may be used to provide notifications of damage to a vehicle or notifications that an object that was left in a vehicle.

According to an aspect of an exemplary embodiment, a method for detecting and classifying objects associated with a vehicle is provided. The method includes: capturing a first image and a second image of a cabin of a vehicle, dividing the first image and the second image into a plurality of regions, comparing a first region of the first image to a second region of the second image, the second region of the second image corresponding to a location in the first region in the first image, in response to detecting a difference between the second region and the first region, classifying an object present in the difference between the second region and the first region and labeling the classified object, and providing a notification of the classified object to at least one from among an occupant of the vehicle and an operator of the vehicle.

The capturing the first image of the cabin may be performed prior to an occupant entering the vehicle, and the capturing the second image of the cabin may be performed after to the occupant exits the vehicle.

The method may further include receiving an input to re-label the classified object from the operator of the vehicle; and re-classifying the object present in the difference between the second region and the first region based on the received input.

The plurality of regions may include two or more from among a front passenger seat, a front driver side, a rear left seat, a rear right seat, a rear seat area, a front passenger floor, a front driver floor, a rear left floor, a rear right floor, a rear floor, a dashboard, a cup holder, a center console, a trunk area and a surface adjacent to rear window.

The providing the notification of the detected difference may include transmitting information on the second image or the classified object to an operator.

The capturing the first image and the second image of the cabin of the vehicle may be performed by a camera.

The comparing the first region of the first image to the second region of the second image may include detecting a change in pixel values in the between the second region and the first region.

The classifying the object in present in the difference between the second region and the first region may include comparing an image of the object to images of objects stored in a database and classifying the object according to a classification of an image stored in the database that is closest to the image of the object.

The classifying the object in present in the difference between the second region and the first region may include identifying the object by performing at least one from among edge matching, greyscale matching and gradient matching.

According to an aspect of an exemplary embodiment, an apparatus that detects and classifies objects associated with a vehicle is provided. The apparatus includes at least one memory comprising computer executable instructions; and at least one processor configured to read and execute the computer executable instructions. The computer executable instructions cause the at least one processor to capture a first image and a second image of an area of a vehicle, divide the first image and the second image into a plurality of regions, compare a first region of the first image to a second region of the second image, the second region of the second image corresponding to the first region in the first image, in response to detecting a difference between the second region and the first region, classify an object present in the difference between the second region and the first region and labeling the classified object; and provide a notification of the classified object to at least one from among an occupant of the vehicle and an operator of the vehicle.

The computer executable instructions may cause the at least one processor to capture the first image prior to an occupant entering the vehicle and to capture the second image after to the occupant exits the vehicle.

The computer executable instructions may cause the at least one processor to receive an input to re-label the classified object from the operator of the vehicle; and reclassify the object present in the difference between the second region and the first region based on the received input.

The plurality of regions may include two or more from among a front passenger seat, a front driver side, a rear left seat, a rear right seat, a rear seat area, a front passenger floor, a front driver floor, a rear left floor, a rear right floor, a rear floor, a dashboard, a cup holder, a center console, a trunk area and a surface adjacent to rear window.

The computer executable instructions may further cause the at least one processor to provide the notification of the detected difference by transmitting information on the second image or the classified object to an operator.

The apparatus may further include a camera mounted in the vehicle. The computer executable instructions may further cause the at least one processor to control the camera to capture the first image and the second image.

The computer executable instructions may further cause the at least one processor to compare the first region of the first image to the second region of the second image by detecting a change in pixel values in the between the second region and the first region.

The computer executable instructions may further cause the at least one processor to classify the object in present in the difference between the second region and the first region by comparing an image of the object to images of objects stored in a database and classifying the object according to a classification of an image stored in the database that is closest to the image of the object.

The computer executable instructions may further cause the at least one processor to classify the object in present in the difference between the second region and the first region by identifying the object by performing at least one from among edge matching, greyscale matching and gradient matching.

According to an aspect of an exemplary embodiment, a non-transitory computer readable medium comprising computer readable instructions is provided. The computer readable instructions are executable by a computer to perform a method including: receiving a first image and a second image of a cabin of a vehicle, dividing the first image and the second image into a plurality of regions, comparing a first region of the first image to a second region of the second image, the second region of the second image corresponding to the first region in the first image, in response to detecting a difference between the second region and the first region, classifying an object present in the difference between the second region and the first region and labeling the classified object, and providing a notification of the classified object to at least one from among an occupant of the vehicle and an operator of the vehicle.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
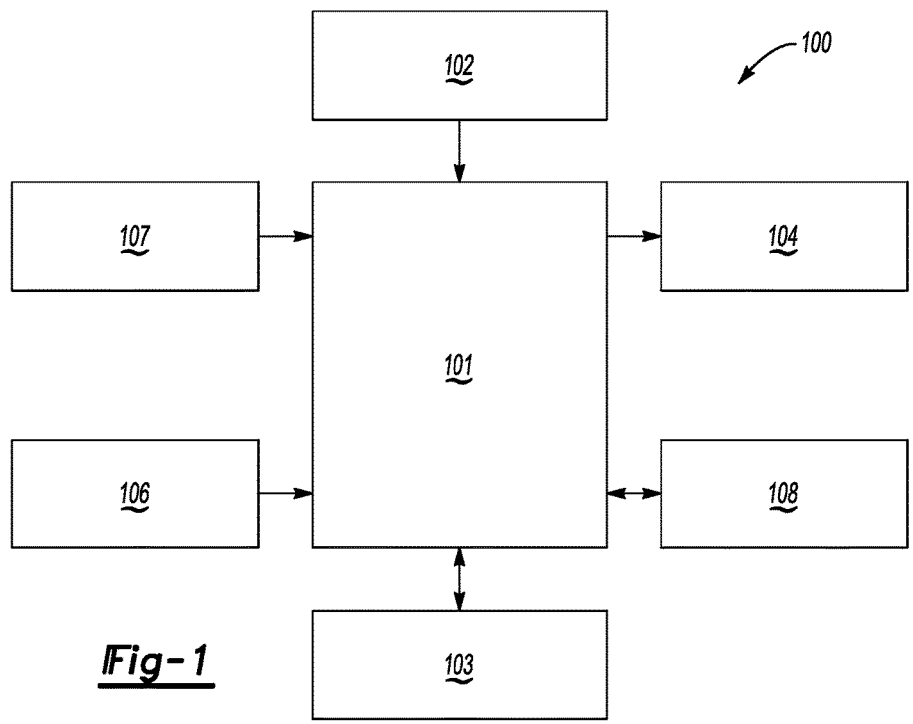
FIG. 1 shows a block diagram of an apparatus that detects and classifies objects associated with a vehicle according to an exemplary embodiment.

An apparatus and method that detect and classify objects associated with a vehicle will now be described in detail with reference to FIGS. 1-4 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles are being equipped with sensors that are capable of detecting conditions of an environment in and around a vehicle. The sensors provide information on conditions that exist in the environment and this information may be used to control the vehicle or to assist an operator of a vehicle. One of the aforementioned sensors, e.g. a camera, may be configured to detect objects, persons, and/or changes in a vehicle. For example, an image taken by a camera may be used by an operator to identify objects, persons, and/or changes to a vehicle.

One method of identifying changes is to compare images of a vehicle taken at different points in time. However, this method may not be efficient as certain regions of the vehicle are more critical than other regions in detecting objects or persons in a vehicle, or in detecting other features of a vehicle. In one example, an image taken by a camera may be divided into regions and only those regions identified as critical to performing object, person, or change identification may be analyzed to identify an object, person, or change in the region. In another example, regions may be ranked and searched based on the ranking to identify an object, person, or change in a region.

FIG. 1 shows a block diagram of an apparatus that detects and classifies objects associated with a vehicle 100 according to an exemplary embodiment. As shown in FIG. 1, the apparatus that detects and classifies objects associated with a vehicle 100, according to an exemplary embodiment, includes a controller 101, a power supply 102, a storage 103, an output 104, a user input 106, an object detection sensor 107, and a communication device 108. However, the apparatus that detects and classifies objects associated with a vehicle 100 is not limited to the aforementioned configuration and may be configured to include additional elements and/or omit one or more of the aforementioned elements. The apparatus that detects and classifies objects associated with a vehicle 100 may be implemented as part of a vehicle, as a standalone component, as a hybrid between an on vehicle and off vehicle device, or in another computing device.

The controller 101 controls the overall operation and function of the apparatus that detects and classifies objects associated with a vehicle 100. The controller 101 may control one or more of a storage 103, an output 104, a user input 106, an object detection sensor 107, and a communication device 108 of the apparatus that detects and classifies objects associated with a vehicle 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the user input 106, the object detection sensor 107, and the communication device 108 of the apparatus that detects and classifies objects associated with a vehicle 100. The information may be sent and received via a bus or network, or may be directly read or written to/from one or more of the storage 103, the output 104, the user input 106, the object detection sensor 107, and the communication device 108 of the apparatus that detects and classifies objects associated with a vehicle 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the user input 106, the object detection sensor 107, and the communication device 108, of the apparatus that detects and classifies objects associated with a vehicle 100. The power supply 102 may include one or more from among a battery, an outlet, a capacitor, a solar energy cell, a generator, a wind energy device, an alternator, etc.

The storage 103 is configured for storing information and retrieving information used by the apparatus that detects and classifies objects associated with a vehicle 100. The storage 103 may be controlled by the controller 101 to store and retrieve information received from the controller 101, the object detection sensor 107, and/or the communication device 108. The information may include information on images taken by the object detection sensor 107 and/or a database including classification information on objects or features used to identify objects or features in the images taken by the object detection sensor 107. The storage 103 may also include the computer instructions configured to be executed by a processor to perform the functions of the apparatus that detects and classifies objects associated with a vehicle 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that detects and classifies objects associated with a vehicle 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notifications may indicate that an object was left in a vehicle, a person is in the vehicle, a change in a feature of the vehicle, and/or identification or classification information on a detected object and/or feature.

The user input 106 is configured to provide information and commands to the apparatus that detects and classifies objects associated with a vehicle 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The object detection sensor 107 may include one or more from among a plurality of sensors including a camera, a laser sensor, an ultrasonic sensor, an infrared camera, a LIDAR, a radar sensor, an ultra-short range radar sensor, an ultra-wideband radar sensor, and a microwave sensor. According to one example, the object detection sensor 107 may be one or more cameras disposed in and around the vehicle. For example, a camera may be disposed in one or more of a headliner of the vehicle, a rear view mirror of the vehicle, a side view mirror of the vehicle, a center high mount stop light of a vehicle, a rear view camera of a vehicle, a trunk of a vehicle, under a hood of a vehicle, on top of a vehicle, a dome light of a vehicle, a dashboard of a vehicle, a center console of a vehicle, etc.

The communication device 108 may be used by the apparatus that detects and classifies objects associated with a vehicle 100 to communicate with various types of external apparatuses according to various communication methods. The communication device 108 may be used to send/receive information on images taken by the object detection sensor 107 and/or a database including classification information on objects or features used to identify objects or features in the images taken by the object detection sensor 107. The communication device 108 may also be used to receive information on images taken by the object detection sensor 107 and/or a database including classification information on objects or features used to identify objects or features in the images taken by the object detection sensor 107 to/from the controller 101 of the apparatus that detects and classifies objects associated with a vehicle 100.

The communication device 108 may include various communication modules such as one or more from among a telematics unit, a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that detects and classifies objects associated with a vehicle 100 may be configured to capture a first image and a second image of an area of a vehicle. For example, the area of the vehicle may be a cabin of the vehicle. The apparatus that detects and classifies objects associated with a vehicle 100 may then be configured to divide the first image and the second image into a plurality of regions, compare a first region of the first image to a second region of the second image, the second region of the second image corresponding to the first region in the first image, in response to detecting a difference between the second region and the first region, classify an object present in the difference between the second region and the first region and labeling the classified object, and provide a notification of the classified object to at least one from among an occupant of the vehicle and an operator of the vehicle.

According to an example, the first region may correspond to a location in the vehicle and the second region may correspond to the same location that the first region corresponds to, except for that the image of the second region is taken at different point in time than the image of the first region.

The controller 101 of the apparatus that detects and classifies objects associated with a vehicle 100 may be configured to capture the first image of the area prior to an occupant entering the vehicle. The controller 101 of the apparatus that detects and classifies objects associated with a vehicle 100 may be configured to capture the second image of the cabin after to the occupant exits the vehicle. For example, a first image may be captured prior to picking up a passenger in ride sharing service and a second image may be captured after the passenger exits the vehicle.

The image may be of an area associated with the occupant or passenger that enters and exits the vehicle. For example, the area of the first and second image may correspond to an area occupied by a passenger that enters/exits a vehicle or may correspond to an area accessed by a passenger such as a trunk, glove box, rear seat. According to another example, an image may be divided up and one or more of the regions corresponding to a passenger or occupant that enters/exits a vehicle or to an area accessed by the passenger or occupant that enters/exits a vehicle such as a trunk, glove box, rear seat.

The regions may include one or more from among a front passenger seat, a front driver side, a rear right seat, a rear left seat, a rear seat area, a front passenger floor, a front driver floor, a rear left floor, a rear right floor, a rear floor, a dashboard, a cup holder, a center console, a trunk area and a surface adjacent to rear window.

The controller 101 of the apparatus that detects and classifies objects associated with a vehicle 100 may be configured to receive an input to re-label the classified object from the operator of the vehicle, and reclassify the object present in the difference between the second region and the first region based on the received input. The operator may receive a classification or identification of an object or feature that is determined by performing object detection on the second image after the difference between the images is detected. The operator may then confirm the classification or identification or revise it as necessary from a remote computer.

The controller 101 of the apparatus that detects and classifies objects associated with a vehicle 100 may be configured to provide the notification of the detected difference by transmitting information on the second image or the classified object to an operator. For example, an operator may be notified of a difference and the operator may view an image of the difference to classify an on object or feature in the difference between the two images. The object or feature may be a forgotten item or damage to the vehicle.

The controller 101 of the apparatus that detects and classifies objects associated with a vehicle 100 may be configured to compare the first region of the first image to the second region of the second image by detecting a change in pixel values in the between the second region and the first region. In addition, the controller 101 of the apparatus that detects and classifies objects associated with a vehicle 100 may be configured to classify the object in present in the difference between the second region and the first region by comparing an image of the object to images of objects stored in a database and classifying the object according to a classification of an image stored in the database that is closest to the image of the object.

The controller 101 of the apparatus that detects and classifies objects associated with a vehicle 100 may be configured to train a classifier with information about regions of interest. One or more classifiers may be provided for each divided region such that there are a plurality of classifiers. In addition each classifier may include may be a neural network classifier, a nearest neighbor classifier, a decision tree classifier or a support vector machine classifier.

The controller 101 of the apparatus that detects and classifies objects associated with a vehicle 100 may be configured to classify the object in present in the difference between the second region and the first region by identifying the object by performing at least one from among edge matching, greyscale matching and gradient matching.

Figure 2:
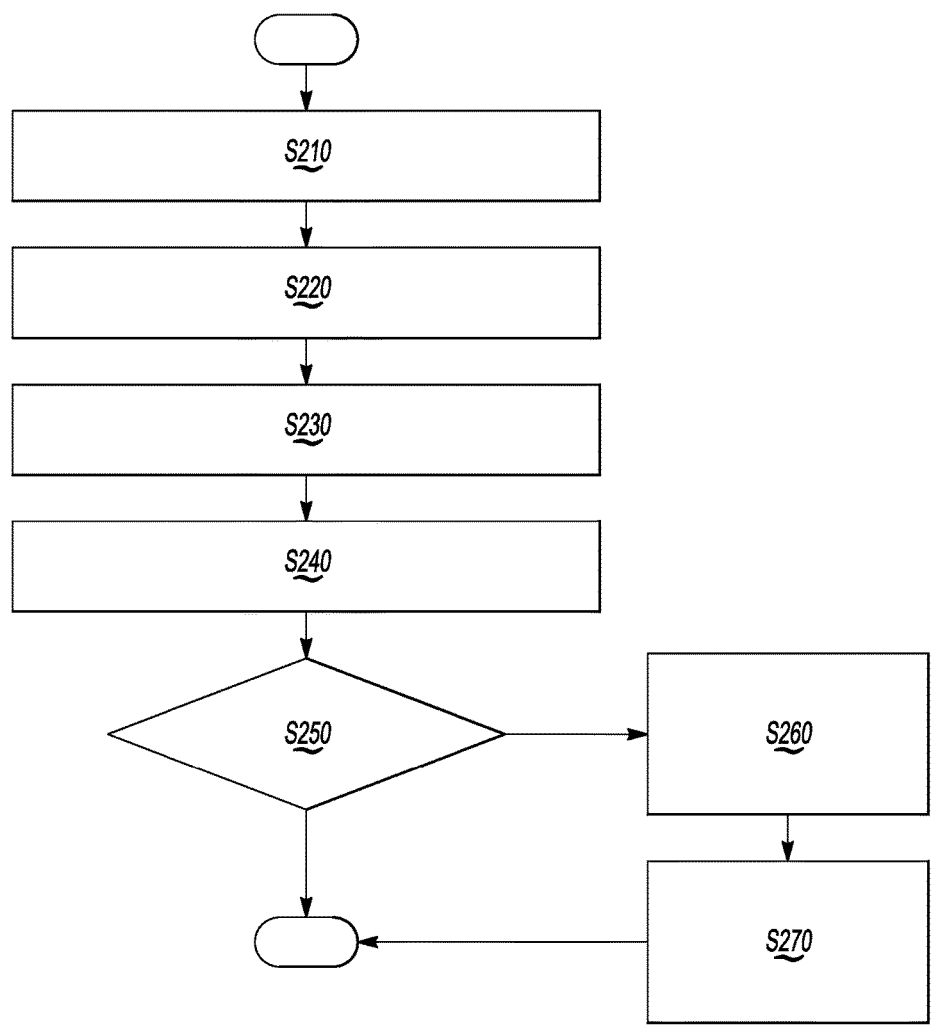
FIG. 2 shows a flowchart for a method of detecting and classifying objects associated a vehicle according to an exemplary embodiment.

FIG. 2 shows a flowchart for a method of detecting and classifying objects associated with a vehicle according to an exemplary embodiment. The method of FIG. 2 may be performed by the apparatus that detects and classifies objects associated with a vehicle 100 or may be encoded into a computer readable medium as instructions that are executable by a computer to perform the method.

Referring to FIG. 2, capturing a first image and a second image of an area of a vehicle is performed in operation S210. The first and second image may be images taken by a same camera or of a same area of a vehicle, but that are taken at different points in time. The first and second image are divided into a plurality of regions in operation S220. A first region of the first image and a second region of the second image are compared in operation S230. In this case the first and second regions are the same region of different images or are regions that correspond to each other, but are taken from different images.

In operations S240 and S250, the regions are analyzed to determine whether a difference is detected between the first image and the image. If a difference is detected between the first image and the second image (operation S250—Yes), classifying an object or feature present in the detected difference between the second region and the first region and labeling classified object is performed in operation S260 and then a notification of the classified object or feature is sent to an operator of the vehicle or the fleet in operation S270. Otherwise, if a difference is not present in the corresponding regions of the first and second images (operation S250—No), the process ends.

Figure 3:
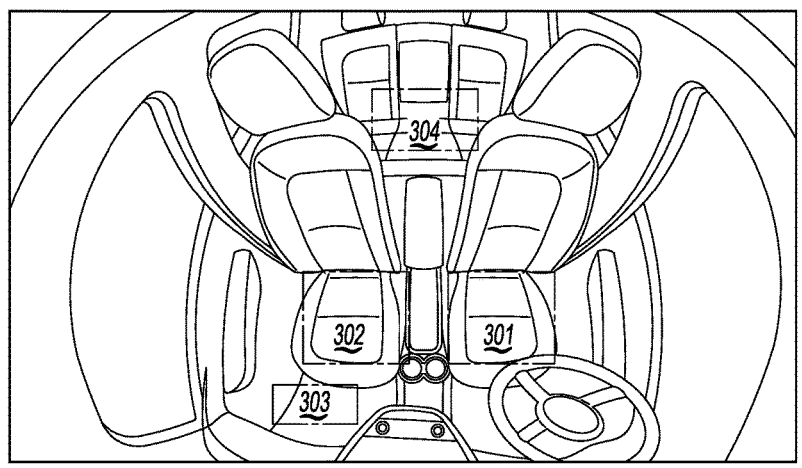
FIG. 3 shows an illustration of dividing an image into regions to perform object detection according to an aspect of an exemplary embodiment.

FIG. 3 shows an illustration of dividing an image into regions to perform object detection according to an aspect of an exemplary embodiment. Referring to FIG. 3, an image 300 taken by a camera in a headliner of a vehicle is shown.

The image is divided up into regions that are recognized as locations where feature or objects of interest may be detected. In this example, a first region 301 is of a driver's seat, a second region 302 is of a front passenger seat, a third region 303 is of a front passenger side floor, and fourth region 304 is of the rear seats. The illustration shown in FIG. 3 is merely an example, and images may be divided into other regions of interest.

In another example, images from one or more from among a rear passenger camera, a front passenger camera and a middle camera may be divided up into regions. A classifier may be trained for each region and that classifier may be used to identify a difference between a first image (e.g., pre-ride image) and a second image (e.g., a post-ride image) for each region.

Figure 4:
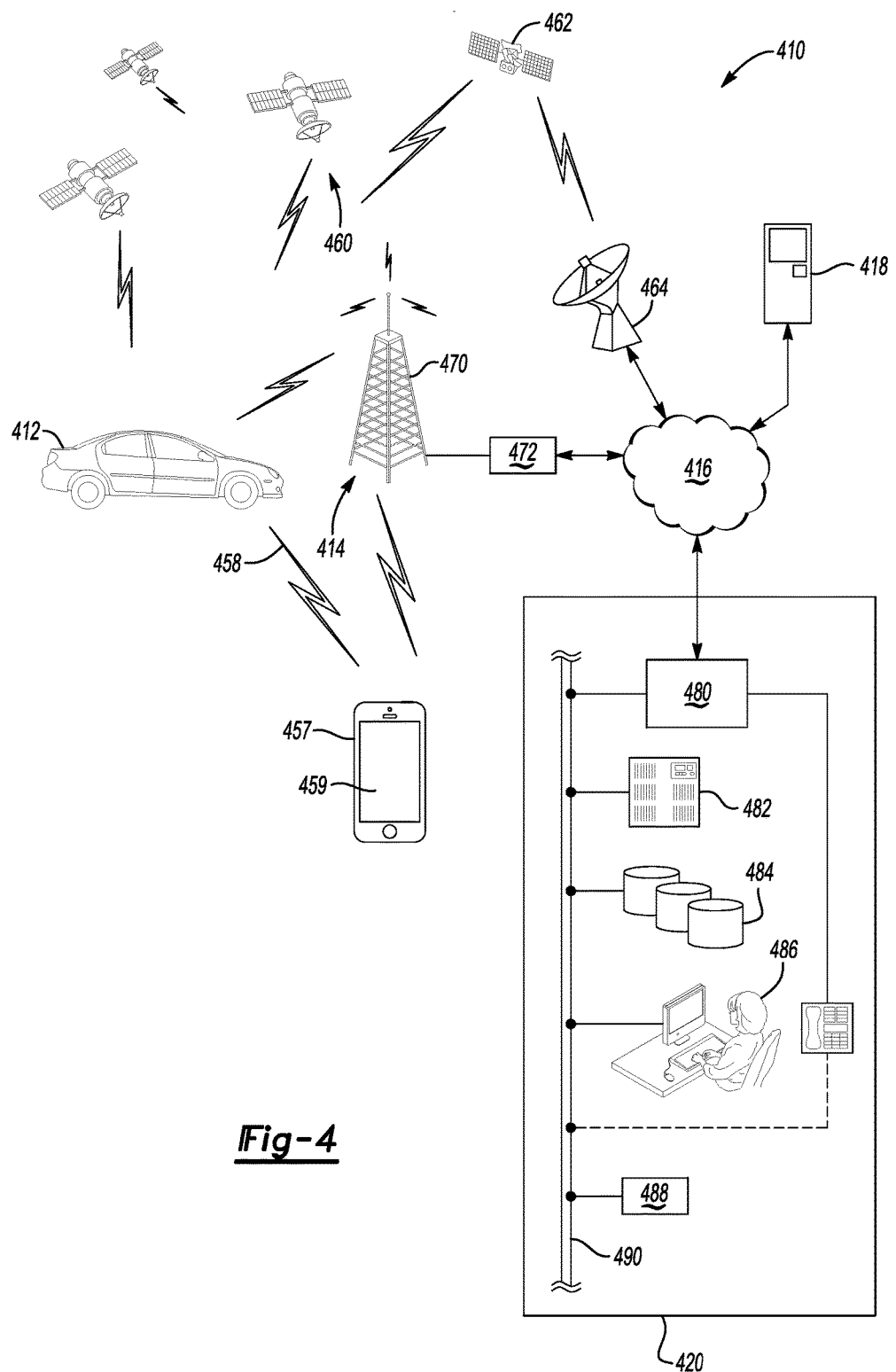
FIG. 4 shows a system capable of providing a notification of a classified object according to an aspect of an exemplary embodiment.

FIG. 4 shows an illustration of an operating environment that comprises a mobile vehicle communications system 410 and that can be used to implement the apparatus and the method for classifying objects in a vehicle cabin.

Referring to FIG. 4, an operating environment that comprises a mobile vehicle communications system 410 and that can be used to implement the apparatus and the method for classifying objects in a vehicle cabin is shown. Communications system 410 may include one or more from among a vehicle 412, one or more wireless carrier systems 414, a land communications network 416, a computer 418, and a call center 420. It should be understood that the disclosed apparatus and the method for classifying objects in a vehicle cabin can be used with any number of different systems and is not specifically limited to the operating environment shown here. The following paragraphs simply provide a brief overview of one such communications system 410; however, other systems not shown here could employ the disclosed apparatus and the method for classifying objects in a vehicle cabin as well.

Vehicle 412 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. One or more elements of apparatus for classifying objects in a vehicle cabin 100 shown in FIG. 1 may be incorporated into vehicle 412.

One of the networked devices that can communicate with the communication device 108 is a wireless device, such as a smart phone 457. The smart phone 457 can include computer-processing capability, a transceiver capable of communicating using a short-range wireless protocol 458, and a visual smart phone display 459. In some implementations, the smart phone display 459 also includes a touch-screen graphical user interface and/or a GPS module capable of receiving GPS satellite signals and generating GPS coordinates based on those signals. One or more elements of apparatus for classifying objects in a vehicle cabin 100 shown in FIG. 1 may be incorporated into smart phone 457.

The GPS module of the communication device 108 may receive radio signals from a constellation 460 of GPS satellites, recognize a location of a vehicle based on the on board map details or by a point of interest or a landmark. From these signals, the communication device 108 can determine vehicle position that is used for providing navigation and other position-related services to the vehicle driver. Navigation information can be presented by the output 104 (or other display within the vehicle) or can be presented verbally such as is done when supplying turn-by-turn navigation. The navigation services can be provided using a dedicated in-vehicle navigation module or some or all navigation services can be done via the communication device 108. Position information may be sent to a remote location for purposes of providing the vehicle with navigation maps, map annotations (points of interest, restaurants, etc.), route calculations, and the like. The position information can be supplied to call center 420 or other remote computer system, such as computer 418, for other purposes, such as fleet management. Moreover, new or updated map data can be downloaded by the communication device from the call center 420. In one example, position information may be used by the apparatus for classifying objects in a vehicle cabin 100 shown in FIG. 1 to indicate location of a vehicle in need of repair or that contains a forgotten object.

The vehicle 412 may include vehicle system modules (VSMs) in the form of electronic hardware components that are located throughout the vehicle and typically receive input from one or more sensors and use the sensed input to perform diagnostic, monitoring, control, reporting and/or other functions. Each of the VSMs may be connected by a communications bus to the other VSMs, as well as to the controller 101, and can be programmed to run vehicle system and subsystem diagnostic tests. The controller 101 may be configured to send and receive information from the VSMs and to control VSMs to perform vehicle functions. As examples, one VSM can be an engine control module (ECM) that controls various aspects of engine operation such as fuel ignition and ignition timing, another VSM can be an external sensor module configured to receive information from external sensors such as cameras, radars, LIDARs, and lasers, another VSM can be a powertrain control module that regulates operation of one or more components of the vehicle powertrain, and another VSM can be a body control module that governs various electrical components located throughout the vehicle, like the vehicle's power door locks and headlights. According to an exemplary embodiment, the engine control module is equipped with on-board diagnostic (OBD) features that provide myriad real-time data, such as that received from various sensors including vehicle emissions sensors, and provide a standardized series of diagnostic trouble codes (DTCs) that allow a technician to rapidly identify and remedy malfunctions within the vehicle. As is appreciated by those skilled in the art, the above-mentioned VSMs are only examples of some of the modules that may be used in vehicle 412, as numerous others are also available.

Wireless carrier system 414 may be a cellular telephone system that includes a plurality of cell towers 470 (only one shown), one or more mobile switching centers (MSCs) 472, as well as any other networking components required to connect wireless carrier system 414 with land network 416. Each cell tower 470 includes sending and receiving antennas and a base station, with the base stations from different cell towers being connected to the MSC 472 either directly or via intermediary equipment such as a base station controller. Cellular system 414 can implement any suitable communications technology, including for example, analog technologies such as AMPS, or the newer digital technologies such as CDMA (e.g., CDMA2000 or 1×EVDO) or GSM/GPRS (e.g., 4G LTE). As will be appreciated by those skilled in the art, various cell tower/base station/MSC arrangements are possible and could be used with wireless system 414. For instance, the base station and cell tower could be co-located at the same site or they could be remotely located from one another, each base station could be responsible for a single cell tower or a single base station could service various cell towers, and various base stations could be coupled to a single MSC, to name but a few of the possible arrangements.

Apart from using wireless carrier system 414, a different wireless carrier system in the form of satellite communication can be used to provide uni-directional or bi-directional communication with the vehicle. This can be done using one or more communication satellites 462 and an uplink transmitting station 464. Uni-directional communication can be, for example, satellite radio services, wherein programming content (news, music, etc.) is received by transmitting station 464, packaged for upload, and then sent to the satellite 462, which broadcasts the programming to subscribers. Bi-directional communication can be, for example, satellite telephony services using satellite 462 to relay telephone communications between the vehicle 412 and station 464. If used, this satellite telephony can be utilized either in addition to or in lieu of wireless carrier system 414.

Land network 416 may be a land-based telecommunications network that is connected to one or more landline telephones and connects wireless carrier system 414 to call center 420. For example, land network 416 may include a public switched telephone network (PSTN) such as that used to provide hardwired telephony, packet-switched data communications, and the Internet infrastructure. One or more segments of land network 416 could be implemented with a standard wired network, a fiber or other optical network, a cable network, power lines, other wireless networks such as wireless local area networks (WLANs), or networks providing broadband wireless access (BWA), or any combination thereof. According to an example, call center 420 may not be connected via land network 416, but may include wireless telephony equipment so that it can communicate directly with a wireless network, such as wireless carrier system 414.

Computer 418 can be one of a number of computers accessible via a private or public network such as the Internet. Each such computer 418 can be used for one or more purposes, such as a web server accessible by the vehicle via the communication device 108 and wireless carrier 414. Other such accessible computers 418 can be, for example: a service center computer where diagnostic information and other vehicle data can be uploaded from the vehicle via the communication device 108; a client computer used by the vehicle owner or other subscriber for such purposes as accessing or receiving vehicle data or to setting up or configuring subscriber preferences or controlling vehicle functions; or a third party repository to or from which vehicle data or other information is provided, whether by communicating with the vehicle 412 or call center 420, or both. A computer 418 can also be used for providing Internet connectivity such as DNS services or as a network address server that uses DHCP or other suitable protocol to assign an IP address to the vehicle 412.

Call center 420 is designed to provide the vehicle electronics with a number of different system back-end functions and, according to the exemplary embodiment shown here, generally includes one or more switches 480, servers 482, databases 484, live advisors 486, as well as an automated voice response system (VRS) 488. These various call center components may be coupled to one another via a wired or wireless local area network 490. Switch 480, which can be a private branch exchange (PBX) switch, routes incoming signals so that voice transmissions are usually sent to either the live adviser 486 by regular phone or to the automated voice response system 488 using VoIP. The live advisor phone can also use VoIP as indicated by the broken line in FIG. 4. VoIP and other data communication through the switch 480 is implemented via a modem (not shown) connected between the switch 480 and network 490. Data transmissions are passed via the modem to server 482 and/or database 484. Database 484 can store account information such as subscriber authentication information, vehicle identifiers, profile records, behavioral patterns, information on images taken by the object detection sensor 107, a database including classification information on objects or features used to identify objects or features in the images taken by the object detection sensor 107, information on recognized objects or features and a corresponding vehicle and vehicle location, and other pertinent subscriber information. Data transmissions may also be conducted by wireless systems, such as 802.11x, GPRS, and the like. Although the illustrated embodiment has been described as it would be used in conjunction with a manned call center 420 using live advisor 486, it will be appreciated that the call center can instead utilize VRS 488 as an automated advisor or, a combination of VRS 488 and the live advisor 486 can be used. The information in the database may be used by a live advisor or server to provide notifications about detected objects, features, damage to the aforementioned vehicles or smartphones via the aforementioned networks.

According to one example, the live advisor 486 may receive a classification information regarding a classification of a region of the plurality of regions and an image of the region. The live advisor 486 may confirm or change the classification information after viewing the image of the region. In another example, the live advisor 486 may receive the classification information and the image if a confidence score of the classification of the region is below a predetermined threshold confidence score. Thus, the live advisor 486 may correct the classification information when necessary.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting and classifying objects associated with a vehicle, the method comprising:
   prior to an occupant entering the vehicle, capturing a first image of a cabin of the vehicle;
   after the occupant exits the vehicle, capturing a second image of the cabin of the vehicle;
   dividing the first image and the second image into a plurality of regions;
   comparing a first region of the first image to a second region of the second image, the second region of the second image corresponding to the first region in the first image;
   in response to detecting a difference between the second region and the first region, classifying an object present in the difference between the second region and the first region and labeling the classified object; and providing a notification of the classified object to at least one from among an occupant of the vehicle and an operator of the vehicle.

2. The method of claim 1, further comprising:
receiving an input to re-label the classified object from the operator of the vehicle; and
re-classifying the object present in the difference between the second region and the first region based on the received input.

3. The method of claim 1, wherein the plurality of regions comprise two or more from among a front passenger seat, a front driver side, a rear left seat, a rear right seat, a rear seat area, a front passenger floor, a front driver floor, a rear left floor, a rear right floor, a rear floor, a dashboard, a cup holder, a center console, a trunk area and a surface adjacent to rear window.

4. The method of claim 1, wherein the providing the notification of the detected difference comprises transmitting information on the second image or the classified object to an operator.

5. The method of claim 1, wherein the capturing the first image and the second image of the cabin of the vehicle is performed by a camera.

6. The method of claim 1, wherein the comparing the first region of the first image to the second region of the second image comprises detecting a change in pixel values in between the second region and the first region.

7. The method of claim 1, wherein the classifying the object present in the difference between the second region and the first region comprises comparing an image of the object to images of objects stored in a database and classifying the object according to a classification of an image stored in the database that is closest to the image of the object.

8. The method of claim 1, wherein the classifying the object in present in the difference between the second region and the first region comprises identifying the object by performing at least one from among edge matching, greyscale matching and gradient matching.

9. A non-transitory computer readable medium comprising computer instructions executable by a computer to perform the method of claim 1.

10. An apparatus that detects and classifies objects associated with a vehicle, the apparatus comprising:
at least one memory comprising computer executable instructions; and
at least one processor configured to read and execute the computer executable instructions, the computer executable instructions causing the at least one processor to:
prior to an occupant entering a vehicle, capture a first image of a cabin of the vehicle;
after the occupant exits the vehicle, capture a second image of the cabin of the vehicle;
divide the first image and the second image into a plurality of regions;
compare a first region of the first image to a second region of the second image, the second region of the second image corresponding to the first region in the first image;
in response to detecting a difference between the second region and the first region, classify an object present in the difference between the second region and the first region and labeling the classified object; and
provide a notification of the classified object to at least one from among an occupant of the vehicle and an operator of the vehicle.

11. The apparatus of claim 10, wherein the computer executable instructions cause the at least one processor to:
receive an input to re-label the classified object from the operator of the vehicle; and
reclassify the object present in the difference between the second region and the first region based on the received input.

12. The apparatus of claim 10, wherein the plurality of regions comprise two or more from among a front passenger seat, a front driver side, a rear left seat, a rear right seat, a rear seat area, a front passenger floor, a front driver floor, a rear left floor, a rear right floor, a rear floor, a dashboard, a cup holder, a center console, a trunk area and a surface adjacent to rear window.

13. The apparatus of claim 10, wherein the computer executable instructions further cause the at least one processor to provide the notification of the detected difference by transmitting information on the second image or the classified object to an operator.

14. The apparatus of claim 10, further comprising a camera mounted in the vehicle,
wherein the computer executable instructions further cause the at least one processor to control the camera to capture the first image and the second image.

15. The apparatus of claim 14, wherein the computer executable instructions further cause the at least one processor to compare the first region of the first image to the second region of the second image by detecting a change in pixel values in between the second region and the first region.

16. The apparatus of claim 10, wherein the computer executable instructions further cause the at least one processor to classify the object present in the difference between the second region and the first region by comparing an image of the object to images of objects stored in a database and classifying the object according to a classification of an image stored in the database that is closest to the image of the object.

17. The apparatus of claim 10, wherein the computer executable instructions further cause the at least one processor to classify the object in present in the difference between the second region and the first region by identifying the object by performing at least one from among edge matching, greyscale matching and gradient matching.

18. A non-transitory computer readable medium comprising computer readable instructions, the computer readable instructions executable by a computer to perform a method comprising:
receiving a first image of a cabin of a vehicle, the first image captured prior to an occupant entering the vehicle;
receiving a second image of the cabin of the vehicle, the second image captured after the occupant exits the vehicle;
dividing the first image and the second image into a plurality of regions;
comparing a first region of the first image to a second region of the second image, the second region of the second image corresponding to the first region in the first image;
in response to detecting a difference between the second region and the first region, classifying an object present in the difference between the second region and the first region and labeling the classified object; and providing a notification of the classified object to at least one from among an occupant of the vehicle and an operator of the vehicle.

* * * * *